Figure 1:
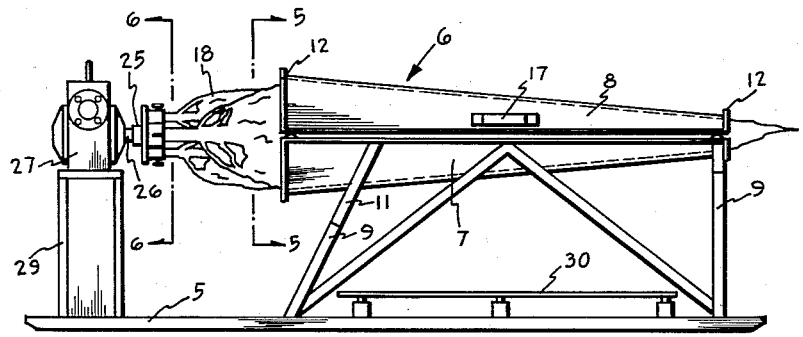

Dec. 27, 1960  J. J. YAFJACK  2,966,111
CHRISTMAS TREE WRAPPING MACHINE
Filed Feb. 4, 1960  2 Sheets-Sheet 1

INVENTOR.
John J. Yafjack
BY
Attorney

Dec. 27, 1960  J. J. YAFJACK  2,966,111
CHRISTMAS TREE WRAPPING MACHINE
Filed Feb. 4, 1960  2 Sheets-Sheet 2

INVENTOR.
John J. Yafjack
BY
Attorney

United States Patent Office 2,966,111
Patented Dec. 27, 1960

2,966,111
CHRISTMAS TREE WRAPPING MACHINE
John J. Yafjack, 6010 SW. 33rd St.,
West Hollywood, Fla.
Filed Feb. 4, 1960, Ser. No. 6,670
5 Claims. (Cl. 100—13)

This invention relates to a wrapping or tying device for trees, such for instance as Christmas trees, where such trees are normally either tied individually or in groups.

In harvesting Christmas trees, it has been customary that the trees be cut in the early fall season of the year and stacked against such time as the trees are to be shipped in transit. The procedure heretofore has been to wrap the trees with twine so as to dispose their branches in compact manner for shipment and with smaller trees, they are usually grouped together with a single tie device manually wrapped thereabout in a spiral manner. Usually when the trees are to be shipped, it is at a time of the year when it is either freezing or snowing and the selection of the trees from the stacked groups and the subsequent tying has been a relatively difficult and unpleasant action, resulting in extremely hard work and with the operators frequently being thoroughly wet from the snow or the like.

The object of this invention is to provide a frusto conical casing into which one or more trees are placed, with their butt portions being held in a novel manner and with means to bodily rotate the group of trees in the housing and simultaneously feed a tie cord through an opening in the housing that quickly and effectively ties the trees together by a spiral wrapping. The invention contemplates a wrapping device wherein either one large tree or one relatively large tree and a plurality of smaller trees may be held at their butt portions and disposed in the housing to be wrapped together into a unitary package.

Novel features of construction and operation of the device will be more clearly apparent during the course of the following description, reference being had to the accompanying drawings, wherein has been illustrated a preferred form of the device and wherein like characters of reference are employed to denote like parts throughout the several figures.

Figure 2:
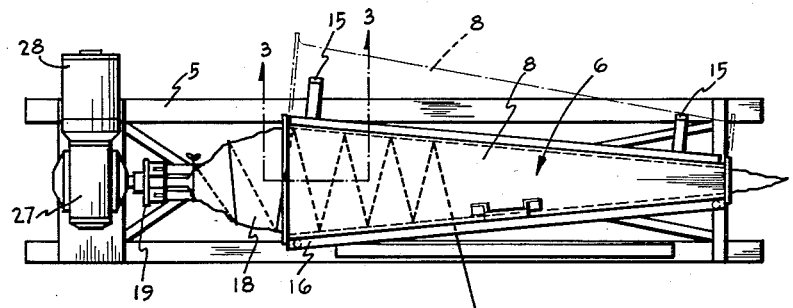
Figure 3:
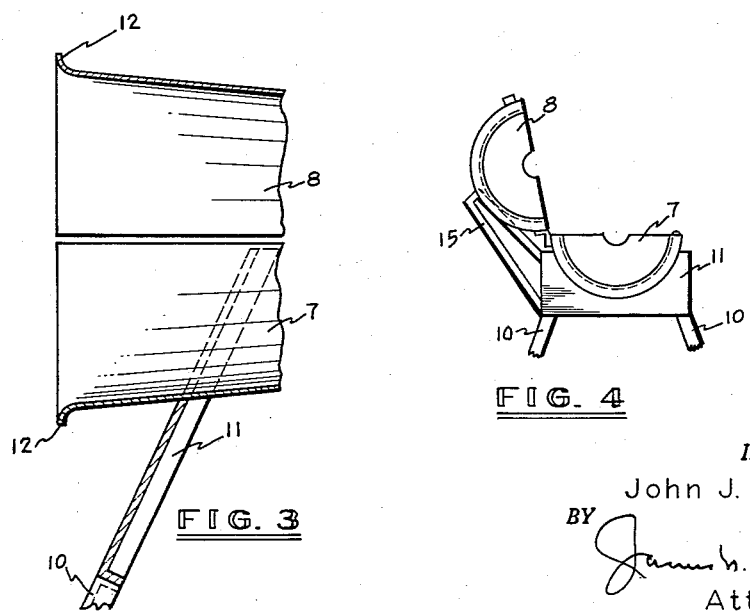
Figure 4:
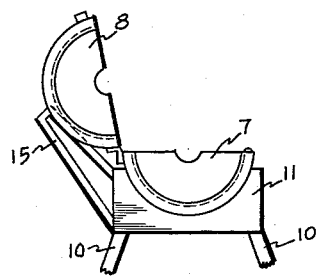
Figure 5:
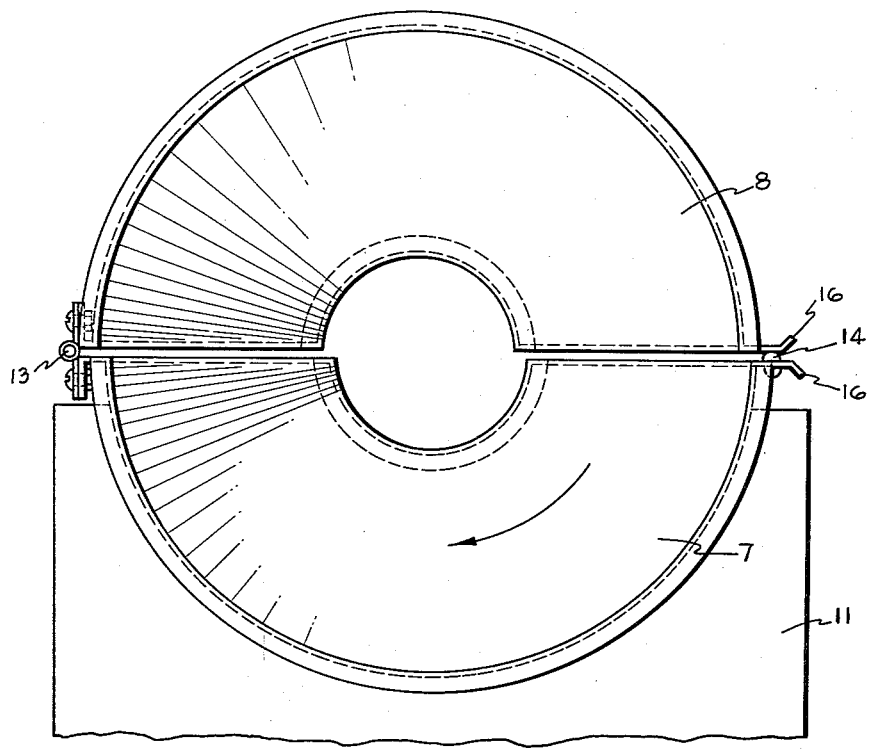
Figure 6:
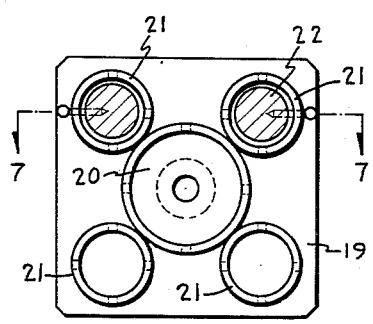
Figure 7:
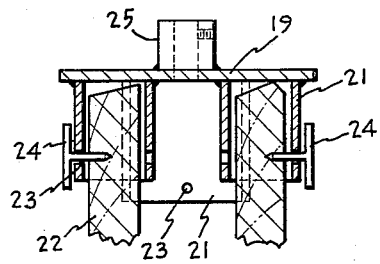

In the drawings:

Figure 1 is a side elevation of a machine constructed in accordance with the invention, Figure 2 is a plan view thereof, Figure 3 is a fragmentary longitudinal section taken on line 3—3 of Figure 2, Figure 4 is an end elevation, parts being broken away, Figure 5 is an enlarged end elevation, taken substantially on line 5—5 of Figure 1, Figure 6 is a face view of a butt supporting plate, taken substantially on line 6—6 of Figure 1, and Figure 7 is a horizontal section taken substantially on line 7—7 of Figure 6.

Referring specifically to the drawings, the numeral 5 designates a base, here being in the form of spaced apart elongated skids. The skids 5 are braced apart in any desirable manner and whereby the entire structure may be shifted from place to place.

Mounted upon the skids 5 at a predetermined elevation, is a frusto conical housing, indicated as a whole by the numeral 6. The housing 6 is formed in two substantially identical sections, embodying a lower section 7 and an upper section 8. The section 7 is suitably supported upon the skids 5 at its opposite ends by supporting braces 9. The braces 9 include leg portions 10 and arcuate plates 11 that conform to the curvature of the section 7. The opposite ends of the sections 7 and 8 terminate in outwardly curved flanges 12. As clearly shown in Figure 5, the sections 7 and 8 are slightly offset laterally and are hinged together at one side by hinge elements 13. The hinge elements 13 may be connected to the sections 7 and 8 in any desirable manner, such as bending one longitudinal edge of each section upon itself to reinforce the hinge mounting. As also shown in Figure 5, the sections 7 and 8 are slightly spaced apart, the spacing upon the hinge side being created by the mounting of the hinge while the spacing upon the opposite side is provided through the medium of rounded buttons or lugs 14. The section 8 is adapted to swing laterally upon the hinges 13 to expose the opening of the section 7 into which the body of the trees are initially disposed. Brackets 15 upon the hinged side, limit the swinging movement of the section 8 to the open position. The sections 7 and 8 upon one free edge are provided with lip portions 16. A handle 17, carried by the section 8 facilitates the opening and closing of the section 8 with respect to the section 7.

Means are provided to rotate a group of trees, indicated at 18 within the housing 6, such means embodying a plate 19, having a fixed central socket 20 and a plurality of radial sockets 21, for the reception of the butt portions 22 of the trees. The flanges formed by the sockets 20 and 21 are apertured at 23 for the driving reception of spikes or other fastening devices 24, that are partially driven into the butt of the trees to fix them with respect to the plate 19 and the sockets 20 and 21. The plate 19 is provided with a rearwardly extending hub portion 25, that is splined or otherwise fixed upon a shaft 26 that projects forwardly from the reduction gear housing 27 and with the reduction gearing being driven by a conventional prime mover 28, such as an electric motor. The gear housing 27 and the motor 28 are supported upon an upstanding bracket 29 in a manner whereby the shaft 26 is axially disposed with respect to the housing 6. The prime mover 28 is actuated in any convenient manner, such for instance as an elongated foot treadle 30, supported upon one skid 5. The housing 6 is preferably formed of sheet metal of a type that has a high degree of resistance to corrosion.

In the use of the device, with the machine being transported to the point of operation, the trees are collected and a grouping determined in accordance with the size of the trees. The housing 6 will accommodate varying sizes of trees or groups of trees. With a selected group of trees, the butt of the largest tree is inserted into the socket 20 and a spike 24 driven through one aperture 23 to be partially embedded into the butt. Smaller trees are then grouped around the larger tree, having their butts positioned within the sockets 21, being also held by the spikes 24. Twine or other suitable tie cord is then fastened around the butts of the trees and secured, after which the cord is extended over the machine to engage over the lower lip portion 16 and inwardly of the button 14 at the larger end of the device. The upper section 8 is then swung downwardly to rest upon the buttons, creating a longitudinal slot throughout the length of the housing. The treadle 30 is then depressed, actuating the prime mover 28 causing the group of trees to be bodily rotated in the housing and, as the trees rotate, the operator moves along the side of the device, causing a spiral wrapping around the group of trees throughout their length. The spirals may be determined in accordance with the movement of the operator and possibly the bulkiness of the trees. When the spiral has been completely wound around the group of trees, the upper section 8 is swung laterally to rest against the brackets 15 and a final tie made at the top portions of the trees, quickly and effectively forming a compact bundle that is easily handled for shipment. The rotation of the trees is in the direction of the arrow shown in Figure 5 so that the trees will override the offset sections 7 and 8 whereby the branches will not engage any abrupt edges and be damaged. After the trees have been wrapped and tied, the spikes 24 are withdrawn and the wrapped bundle of trees then removed from the housing. The device readily adapts itself to either the wrapping of a single large tree or a group of relatively smaller trees and the trees will rotate in the housing smoothly under the influence of the rotative plate 19.

It will be apparent from the foregoing that a very novel form of wrapping device has been provided. The structure is such that it greatly facilitates the bundling or wrapping of trees for shipment and permits the wrapping of the trees in a minimum of time as compared with the old and well known manual handling and wrapping. The structure is simple, strong, durable, economical to manufacture and highly effective as a means to group and wrap a plurality of trees together. It will be apparent, when the device is moved to a point of operation, that a suitable source of electrical energy must be supplied and such is accomplished by a conventional generator that may be carried upon a truck or other vehicle.

The machine has been illustrated as being disposed upon a pair of skids in order to transport the device over the ground to the point of operations. As the trees are cut and piled up in scattered lots, the machine can be put on a flat body trailer and hauled around by tractor or jeep and a generator operated by gasoline to generate electricity capable of driving the prime mover 28 is also disposed upon the trailer and functions to provide the necessary source of electrical current. The machine can tie approximately four times as fast as a man and it makes a much neater and uniform bundle. Therefore, more trees can be packed in a truck when stacked end to end. When trees are tied by hand, the bundles vary in circumference as some under-tiers are loose and some tighter. When tying by the machine of this application, the limbs fall in place wherever there are scarce branches. Also, the tigher you hold back the cord, the tighter the bundle will be. Also the limbs have a tendency of freezing and get brittle when they are tied by hand and break when there is pressure put on a few limbs at a time. With the machine of this invention, the limbs are progressively pushed into compact relation by the conical housing 6 so that they are disposed in a uniform conical manner that permits of them being securely tied together and with the tying being equalized on all of the limbs. While the device has been primarily constructed to wrap green or natural trees it follows, that the structure could function equally as well in wrapping or bundling artificial or manufactured trees.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A wrapping machine for Christmas trees whereby the branches of the trees are circumferentially wrapped together into a compact bundle for shipment, comprising a base, a frusto-conical hollow housing mounted upon the base, the housing embodying two substantially identical sections that are horizontally divided, a lower section of the housing being fixedly supported with respect to the base, the upper section being hingedly connected to the lower section for lateral swinging movement to expose the opening of the lower section for the reception of the body of the trees, the sections being slightly spaced apart for their full length, butt portions of the trees extending outwardly from one end of the housing, anchoring means for the butts of the trees, the said anchoring means being rotative whereby to bodily rotate the trees in the housing, means for rotating the anchoring means, the butts of the trees being bodily tied together by a wrapping cord and with the cord being manually extended through the spacing at one side of the housing and manually controlled to be spirally wrapped about the trees for their major height under the influence of the rotation of the trees in the housing.

2. A wrapping machine for Christmas trees whereby a plurality of trees are grouped together and circumferentially wrapped together into a compact bundle for shipment, comprising a base frame, a frusto conical hollow housing supported upon the base and with the housing being open at its opposite ends, the housing embodying two substantially identical semi-circular sections that are horizontally divided, a lower section of the housing being fixedly supported in a horizontal manner with respect to the base, the upper section of the housing being hingedly connected to the lower section at one side for lateral swinging movement to expose the opening of the lower section for the reception of the body of the trees, the sections being slightly spaced apart for their full length, the butt portions of the trees extending outwardly from a larger end of the housing, anchoring means for the butts of the trees whereby the butts of the trees are disposed in substantially parallel and equidistantly spaced relation, means for detachably fixing the butts of the trees in the anchoring means to prevent disengagement of the butts during the wrapping operation, the said anchoring means being rotative whereby to bodily rotate the trees in the housing, a prime mover for driving the anchoring means, a flexible tie device that is initially tied about the butts of the trees and with the tie device being trained through the spacing of the housing at one side and progressively fed forward to spirally wrap about the trees for their major length during the rotation of the anchoring means.

3. The structure according to claim 2 wherein the housing sections at one side are provided with flanges that are parallel with respect to each other, spacer buttons carried by the flange of the lower section and whereby to maintain the flange of the upper section in spaced apart relation throughout the length of the housing for forming a guide opening to be traversed by the tie device, the said upper section being horizontally and transversely offset with respect to the lower section whereby to avoid any sharp edges and to prevent damage to the foliage of the tree during their rotative movement in the housing.

4. The structure according to claim 2 wherein the anchoring means embodies a flat plate having a centrally disposed drive shaft at one side, the said plate upon its opposite side being provided with an axially arranged cylindrical open socket and a plurality of radially disposed open sockets that are disposed in concentric relation to the first named socket, drive means for the shaft of the plate that comprises a reduction gearing and a prime mover, the several sockets being apertured upon their side walls for the reception of pointed driving spikes that are adapted to be engaged into the butt portions of the trees disposed within the sockets and whereby to prevent disengagement of the butts from the sockets during the rotative movement of the trees.

5. The structure according to claim 2 wherein the housing is supported upon an open frame, the frame being supported upon a pair of skid members whereby the device may be transported in sliding movement over the ground and a connector bar disposed upon one skid whereby to actuate switch devices for the control of the prime mover.

References Cited in the file of this patent

UNITED STATES PATENTS

| | | |
|---|---|---|
| 2,792,775 | Beyette | May 21, 1957 |

FOREIGN PATENTS

| | | |
|---|---|---|
| 103,118 | Switzerland | Jan. 16, 1924 |
| 424,482 | Germany | Jan. 25, 1926 |